US 11,105,208 B2

(12) United States Patent
Figeureu et al.

(10) Patent No.: US 11,105,208 B2
(45) Date of Patent: Aug. 31, 2021

(54) STIFFENED PLATFORM

(71) Applicant: SAFRAN AIRCRAFT ENGINES, Paris (FR)

(72) Inventors: Claire Marie Figeureu, Moissy-Cramayel (FR); Thomas Alain De Gaillard, Moissy-Cramayel (FR); Oscar-Emmanuel Gnangnon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 109 days.

(21) Appl. No.: 16/516,375

(22) Filed: Jul. 19, 2019

(65) Prior Publication Data

US 2020/0024960 A1   Jan. 23, 2020

(30) Foreign Application Priority Data

Jul. 20, 2018   (FR) ...................................... 1856773

(51) Int. Cl.
*F01D 5/14*   (2006.01)
*F02K 3/06*   (2006.01)
(Continued)

(52) U.S. Cl.
CPC ............... *F01D 5/147* (2013.01); *F02K 3/06* (2013.01); *F04D 19/002* (2013.01);
(Continued)

(58) Field of Classification Search
CPC ........ F01D 5/147; F01D 11/008; F01D 5/025; F01D 5/066; F01D 11/005; F02K 3/06; F04D 19/002; F04D 29/325; F04D 29/388; F04D 29/324; F04D 29/644; F04D 29/083; F05D 2220/36; F05D 2240/301; F05D 2240/80; F05D 2260/30; Y02T 50/60
See application file for complete search history.

(56) References Cited

U.S. PATENT DOCUMENTS

2014/0003949 A1   1/2014   Adam et al.
2016/0318012 A1   11/2016  Causse et al.
2019/0206583 A1   7/2019   Grandjean et al.

FOREIGN PATENT DOCUMENTS

EP   2253802 A2   11/2010
EP   2463482 A2   6/2012
(Continued)

OTHER PUBLICATIONS

Search Report issued in French Patent Application No. 1856773 dated Jul. 5, 2019.

*Primary Examiner* — Jacob M Amick
*Assistant Examiner* — Charles J Brauch
(74) *Attorney, Agent, or Firm* — Pearne & Gordon LLP

(57) ABSTRACT

A platform for a fan of a turbomachine that will be mounted on a hub of the fan between two adjacent blades, the platform comprising a principal wall with a longitudinal principal orientation, that has a curved shape along the longitudinal direction, and a stiffener that is mounted on a lower face of the principal wall, of which the section of the stiffener, in a plane perpendicular to the longitudinal direction is globally in the form of a U open towards the principal wall. The stiffener comprises at least two straight segments inclined relative to each other and inclined relative to the longitudinal principal direction.

8 Claims, 4 Drawing Sheets

(51) Int. Cl.
*F04D 19/00* (2006.01)
*F04D 29/32* (2006.01)
*F04D 29/38* (2006.01)

(52) U.S. Cl.
CPC ......... *F04D 29/325* (2013.01); *F04D 29/388* (2013.01); *F05D 2220/36* (2013.01); *F05D 2240/301* (2013.01); *F05D 2240/80* (2013.01)

(56) References Cited

FOREIGN PATENT DOCUMENTS

| | | | | |
|---|---|---|---|---|
| EP | 2837772 | A1 * | 2/2015 | ............ F01D 11/08 |
| EP | 2998515 | B1 | 2/2017 | |
| EP | 2837772 | B1 | 6/2018 | |

\* cited by examiner

STIFFENED PLATFORM

This application claims priority to French Patent Application No. 18 56773 filed Jul. 20, 2018, the contents of which is incorporated by reference herein in its entirety.

TECHNICAL FIELD

The invention relates to a platform for reconstitution of a turbomachine fan flow stream comprising stiffening means.

The invention more specifically relates to a platform designed to be installed on a fan with a low hub ratio.

STATE OF PRIOR ART

In a turbomachine, a platform is a component that is installed between two adjacent blades, particularly at blade roots, to make a continuous wall with a reduced number of asperities.

Such platforms are installed particularly on the fan located upstream from the turbomachine.

A hub ratio for a fan is defined as being the ratio between the radial dimension of a first radially internal point and the radial dimension of a second radially external point of the fan.

The first point is located at the intersection of the leading edge of a blade with the wall of the hub that radially delimits the air flow stream inside the fan. The second point is located in the same axial position as the first point, along the principal axis of the fan, and it is located on a radially internal wall of the fan case that radially delimits the exterior of the flow stream.

A low hub ratio implies that the blade roots are close to each other and therefore that the width of each platform that is mounted on the hub is small.

Furthermore, in a fan with a low hub ratio, the blades are strongly curved, in other words the profiles of the intrados walls and extrados walls are strongly curved.

The result is that the side edges of the platform are also strongly curved and they are very close to each other.

Therefore the principal shape of the platform is also curved.

The platform is composed principally of a principal wall, that has the same curved shape as the platform, and a stiffener that is arranged on a radially internal face of the principal wall.

Due to fabrication constraints, the stiffener is straight and extends along the longitudinal length of the principal wall.

However, as mentioned above, the principal wall is also curved, which causes a problem of integration of the straight stiffener on the principal wall.

The purpose of the invention is to disclose a platform for a fan with a low hub ratio, that comprises a stiffener adapted to the curved shape of the principal wall of the platform.

PRESENTATION OF THE INVENTION

The invention discloses a turbomachine fan platform that will be mounted on a hub of the fan between two adjacent blades, the platform comprising a principal wall with a longitudinal principal orientation, that has a curved shape along the longitudinal direction, a stiffener that is mounted on a face of the principal wall, of which the section of the stiffener in a plane perpendicular to the principal longitudinal direction of the principal wall, comprises a first transverse end wall located on a first side, a second transverse end wall located at a second end and a back wall transversely connecting the two transverse end walls, characterised in that the stiffener comprises at least two straight segments inclined relative to each other and inclined relative to the longitudinal principal direction.

Manufacturing of the stiffener in two inclined segments makes it possible to follow the curvature of the principal wall, while keeping each segment of the stiffener straight.

Preferably, each segment comprises a proximal end that is located longitudinally close to an adjacent segment, and the proximal end of each segment is offset transversely relative to the proximal end of an adjacent segment along a transverse direction perpendicular to the longitudinal principal direction of the principal wall.

Preferably, the proximal ends of two adjacent segments are longitudinally adjacent to each other.

Preferably, the first transverse end wall of one segment and the second transverse end wall of an adjacent segment prolong each other.

Preferably, one end of the first transverse end wall of a segment that is located at the proximal end of said segment, is offset transversely from one end of the second transverse end wall of an adjacent segment, that is located at the proximal end of said adjacent segment.

The invention also relates to a turbomachine fan comprising a central hub supporting blades distributed around a principal axis of the fan and platforms according to any one of the preceding claims, in which each platform is fixed to the hub and is positioned between two adjacent blades.

Preferably, the principal wall of each platform comprises a first edge that is in contact with an intrados wall of a first blade and a second edge that is in contact with an extrados wall of a second blade.

Preferably, the minimum transverse distance between the first edge and the second edge is less than the width of the stiffener.

BRIEF DESCRIPTION OF THE DRAWINGS

Other characteristics and advantages of the invention will become clear after reading the following detailed description, that will be better understood by referring to the appended figures among which.

DETAILED PRESENTATION OF PARTICULAR EMBODIMENTS

The vertical, longitudinal and transverse orientations according to the V, L, T coordinate system shown on the figures will be adopted for the description of the invention.

Figure 1:
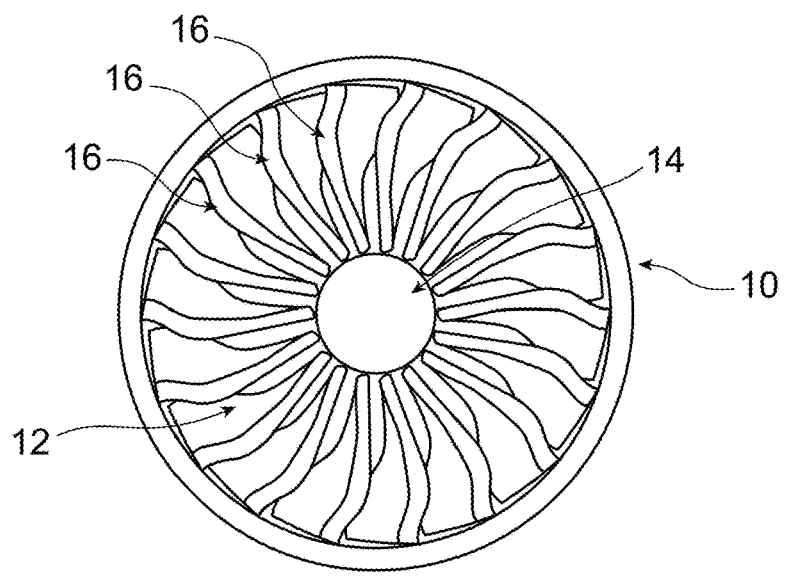
FIG. 1 is an end view of an aircraft turbomachine showing the upstream fan.

FIG. 1 shows an aircraft turbomachine 10 comprising an upstream fan 12.

The fan 12 compresses a large mass of cold air, part of this air mass compressed by the fan 12 is injected into a core flow of the turbomachine and the remainder of this air mass is injected in a bypass flow of the turbomachine, forming a cylindrical flow stream surrounding the engine flowing in the aft direction to create thrust.

The fan 12 comprises a central hub 14 and a plurality of blades 16 supported by the hub 14 and that extend in the radial direction relative to the principal axis of the turbomachine 10 from the hub 14.

Figure 2:
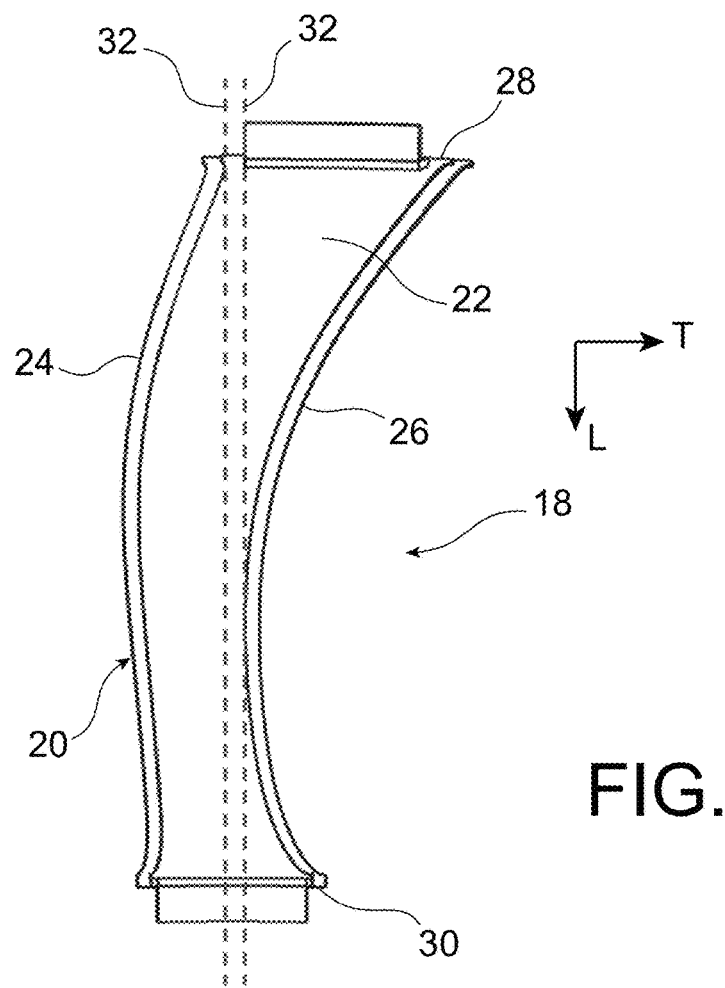
FIG. 2 is a top view of a platform.

The hub supports a plurality of platforms 18, one platform 18 of which is shown in FIG. 2 and subsequent figures, that are installed between the blades 16, close to the root of each blade 16.

The platforms 18 form a part of the external wall of the hub 14, delimiting the air flow stream, to limit aerodynamic disturbances between the blades 16.

As can be seen on FIG. 2, each platform 18 comprises a principal wall 20, that reforms the external wall of the hub 14, the external face 22 of which comes into contact with the air flow stream.

The principal wall 20 of the platform 18 has a principal longitudinal orientation globally parallel to the principal axis of the turbomachine 10. It is delimited transversely by a first edge that will be called the intrados edge 24 and that will come into contact with the intrados wall of a first blade 16, and by a second edge that will be called the extrados edge 26 and that will come into contact with the extrados wall of a second blade 16 that is immediately adjacent to the first blade.

The principal wall 20 of the platform 18 is also delimited longitudinally by an upstream edge 28 and a downstream edge 30 that comprise means of fastening the platform 18 on the hub 14 of the fan 12.

With reference to FIG. 1, the fan 12 is designed based on a hub ratio equal to dm/df, in which dm is the diameter of the hub 14 and df is the outside diameter of the hub.

One line of development to improve the efficiency of a turbomachine consists of increasing its dilution ratio, in other words the ratio between the mass of air circulating through the fan that is commonly called the cold air flow, and the mass of the core air flow or hot air flow, that has passed through the fan and is injected into the core flow stream of the turbomachine. This hot flow passes in particular through the compressor and is heated in the combustion chamber.

It has been suggested that the hub ratio of the fan 12 can be reduced, to increase the dilution ratio.

Thus, while keeping the same diameter df of the fan 12, the diameter dm of the hub 14 is reduced.

This has the consequence that the roots of the blades 16 are brought closer to each other.

Each blade 16 is also strongly cambered at its root, which implies a strong curvature between the leading edge and the trailing edge.

Consequently, the intrados edge 24 and the extrados edge 26 of the principal wall 20 of the platform 18 also have a large curvature. Consequently, the principal wall 20 of the platform 18 has a generally very strong curvature.

This low hub ratio also implies that the transverse distance between the intrados edge 24 and the extrados edge 26 is relatively low, as illustrated by the longitudinal segments 32 with the lowest transverse distance between the intrados edge 24 and the extrados edge 26.

Figure 3:
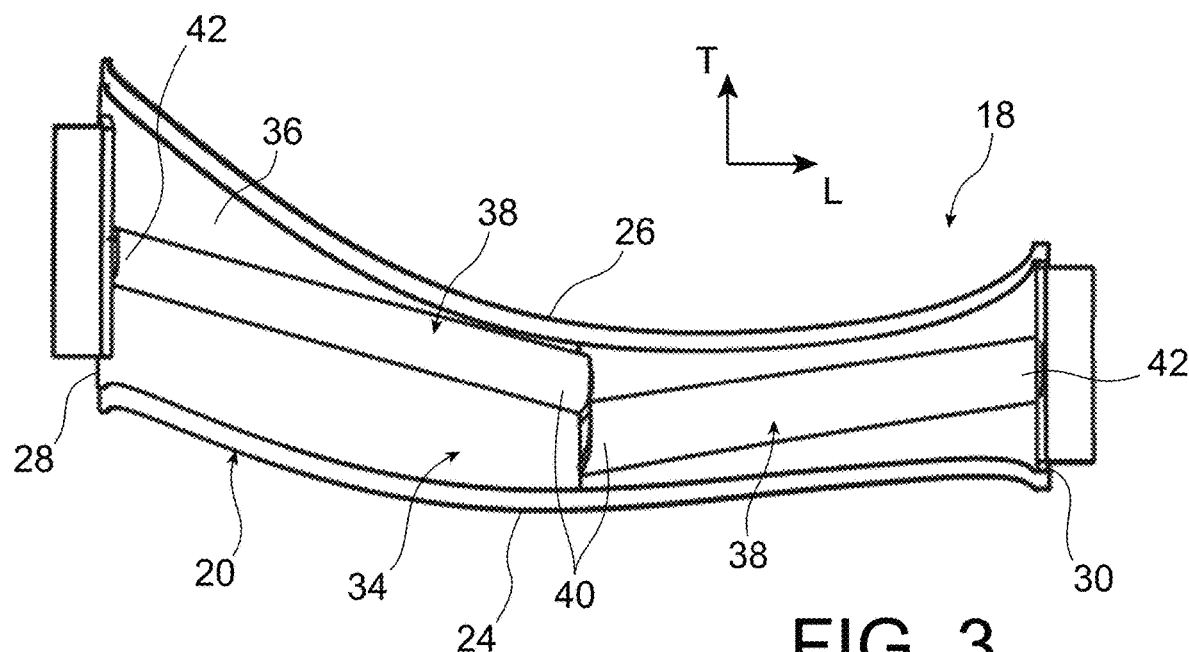
FIG. 3 is a bottom view of the platform shown in FIG. 2.

As can be seen on FIG. 3 and subsequent figures, the platform 18 also comprises a stiffener 34 that is faced to the lower face 36 of the principal wall 20.

In this case, the section of the stiffener 34 is an open U section facing the principal wall 20. It will be understood that the invention is not limited to this shape of stiffener and that the platform 18 may comprise a stiffener 34 with another section.

Figure 7:
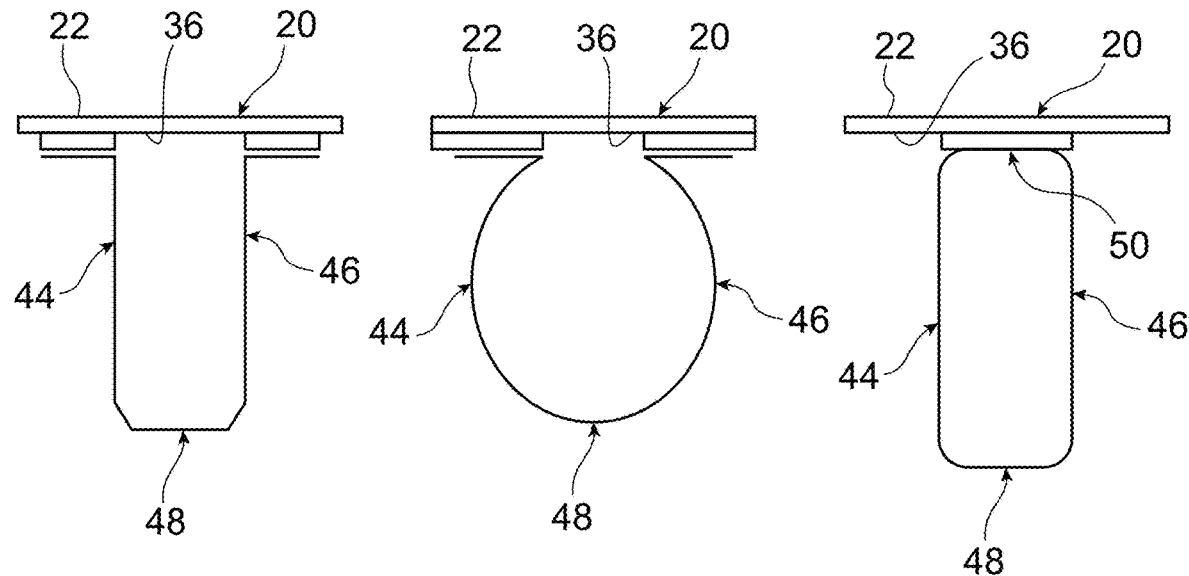
FIG. 7 is a diagrammatic sectional view of several embodiments of the platform showing different sections of the stiffener.

FIG. 7 shows different shapes of the stiffener section. Thus, the section of the stiffener may be U-shaped as shown in the illustration at the left, or omega-shaped open at the top as shown in the illustration at the centre, or closed for example like an O-shape as represented in the illustration at the right.

Here, the stiffener 34 comprises a first transverse end wall 44 that extends vertically downwards and that is located at a first transverse end of the platform 18, a second transverse end wall 46 that extends vertically downwards and that is located at a second transverse end of the platform 18 and a bottom wall 48 transversely connecting the lower end edges of two transverse end walls 44, 46, that are located at a distance from the principal wall 20.

It will be understood that in the embodiment in which the stiffener section is omega-shaped, the transverse end walls 46 and 48 are formed from consecutive curved segments of this omega.

When the section of the stiffener 34 has a closed shape, as in this case an O-shape, the stiffener 34 also comprises an upper wall 50 that is adjacent to the lower face 36 of the principal wall 20.

In this case, it will be considered that the first transverse end wall 44 is located close to the extrados edge 26 and that the second transverse end wall is located close to the intrados edge 24.

The stiffener 34 is also made of a single part made of a composite material added onto the principal wall 20.

The stiffener 34 is a straight part lying along a longitudinal principal direction of the platform 18.

As mentioned above, the transverse distance between the intrados edge 24 and the extrados edge 26 is relatively small and this distance is less than the minimum width of the stiffener 34 so that it can make the platform 18 sufficiently stiff, in other words less than the transverse distance between the transverse end walls 44, 46.

The stiffener 34 is made from at least two straight segments 38, in which the orientation and the position of each segment 38 relative to the principal wall 20 are such that the stiffener 34 can be made.

As can be seen on FIG. 3, each segment 38 is inclined relative to the longitudinal principal direction of the platform 18 and each is inclined relative to the other forming a V open towards the extrados edge 26.

Each segment 38 comprises a first end 40, that will be called the proximal end in the following, that is longitudinally close to the other segment 38, in other words is located at an intermediate longitudinal position along the platform 18.

This intermediate longitudinal position of the proximal end 40 is defined as a function of the general curvature of the principal wall 20. According to one non-limitative example, the proximal end 40 is located longitudinally at the middle of the principal wall.

In the embodiment in which the stiffener is made of two segments 38, each of these two segments 38 comprises a second end 42, that will be called the distal end in the following and that is located at the upstream edge 28 or the downstream edge 30 of the principal wall 20.

Figure 4:
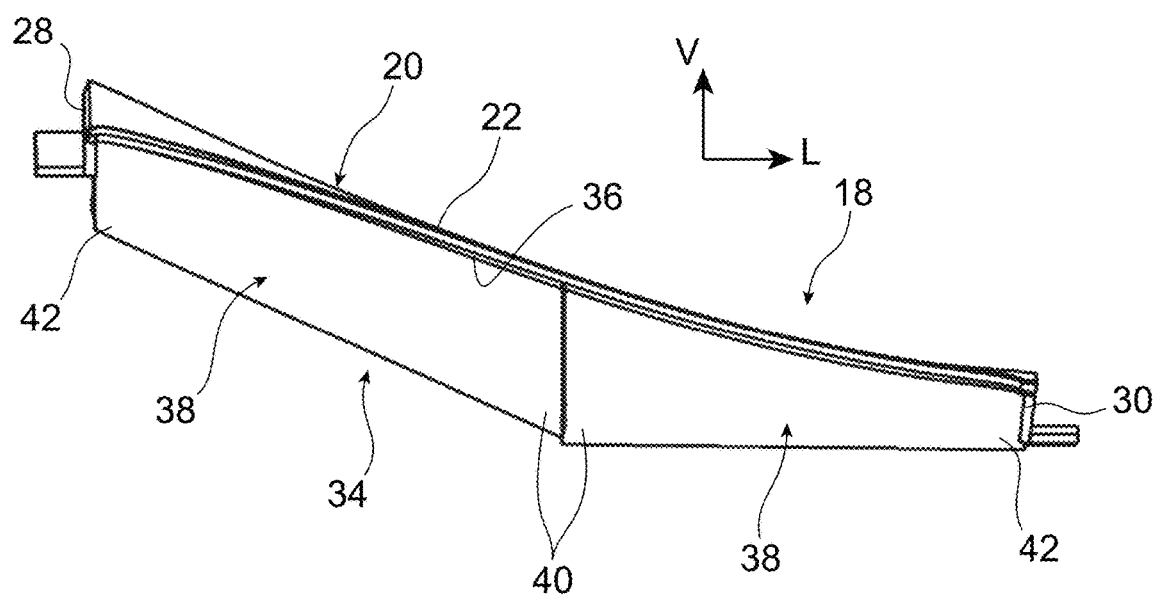
FIG. 4 is a side view of the platform shown in FIG. 2.
Figure 5:
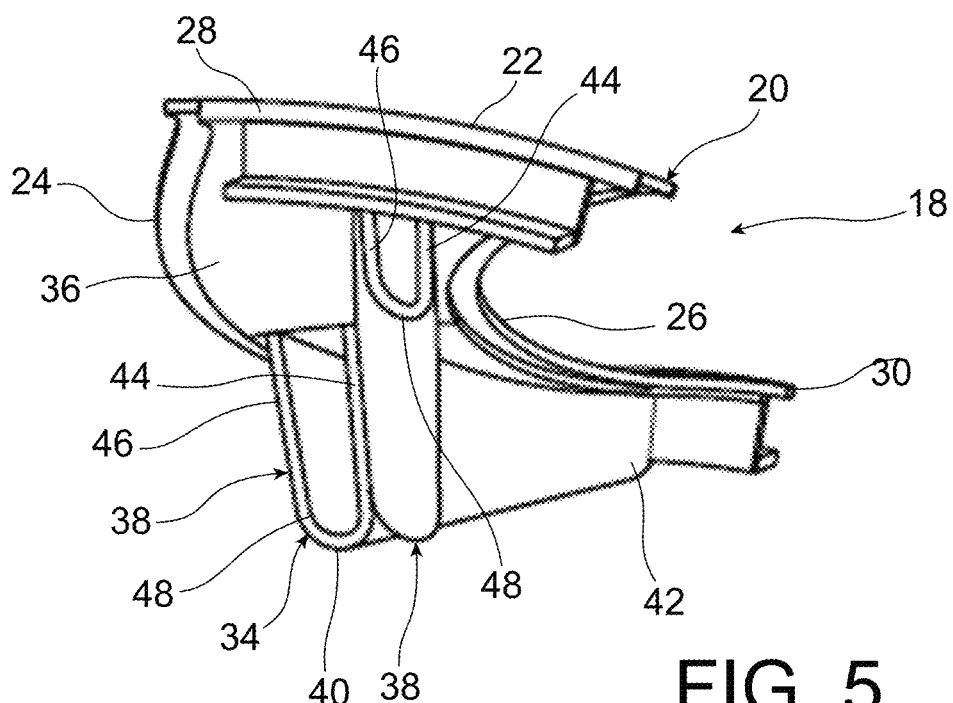
FIG. 5 is an end view of the platform shown in FIG. 2.

Preferably, as can be seen on FIG. 4, the two proximal ends 40 of the two segments 38 are longitudinally adjacent to each other. This prevents part of the principal wall 20 from being stiffened by the stiffener 34.

Each end 40, 42 has a plane end edge that extends in a plane approximately perpendicular to the longitudinal direction, such that the two proximal ends 40 of the two segments 38 will be adjacent.

As mentioned above with reference to FIG. 7, the section of the stiffener 34 in a vertical transverse plane is in the shape of a U, 0 or omega. Consequently, the section of each segment 38 of the stiffener 34 has the same shape.

Each stiffener 38 then comprises a first transverse end wall 44 that extends vertically downwards and that is located at a first transverse end of the platform 18, a second transverse end wall 46 that extends vertically downwards and that is located at a second transverse end of the platform 18 and a bottom wall 48 transversely connecting the lower end edges of two transverse end walls 44, 46, that are located at a distance from the principal wall 20.

When the section of the stiffener 34 has a closed shape, as in this case an O-shape, the stiffener 34 also comprises an upper wall 50 that is adjacent to the lower face 36 of the principal wall 20.

As can be seen on FIG. 3, the proximal ends 40 of the two segments 38 are transversely offset from each other. It will be understood that the invention is not limited to this embodiment and that the proximal ends 40 of the two segments 38 can also be located in the same transverse position.

According to a first aspect of the embodiment shown on FIG. 3, the transverse offset of the two proximal ends 40 of the segments 38 is such that the ends of the transverse end walls 44, 46 are offset transversely relative to each other.

Figure 6:
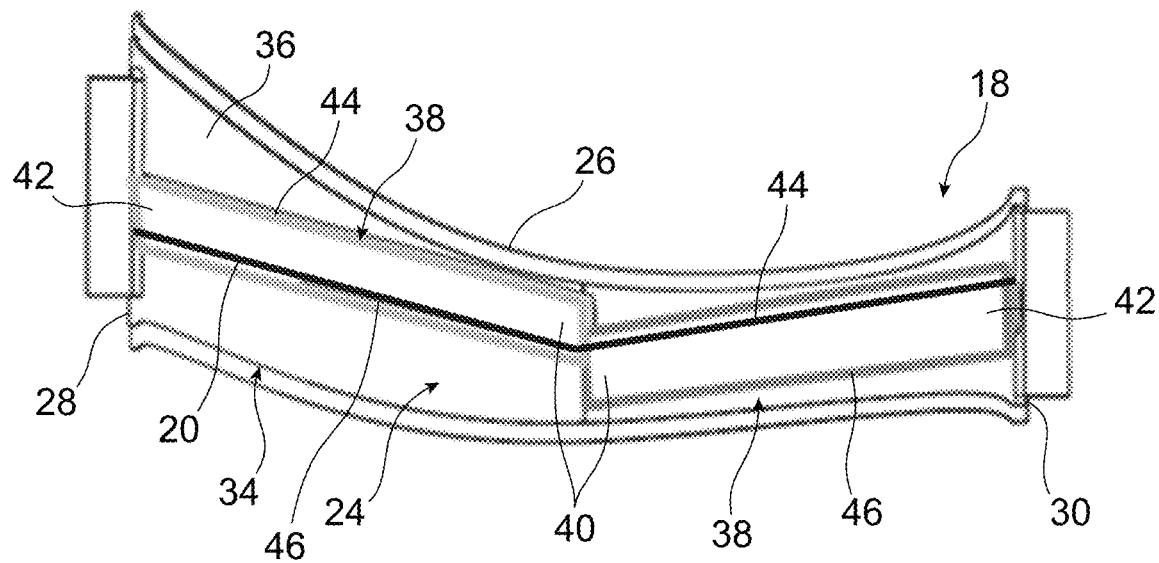
FIG. 6 is a view similar to that in FIG. 3, showing a variant embodiment of the stiffener.

According to one variant of this embodiment, as shown on FIG. 6, the first transverse end wall 44 of one segment and the second transverse end wall 44 of one segment and the second transverse end wall 46 of the other segment 38 prolong each other, thus forming a continuous V-shaped wall.

This junction between the two walls 44, 46 can increase the stiffness conferred by the stiffener 34.

In other words, the stiffener 34 is formed from a band of tissues, one segment of which forms the transverse end walls that are continuous with each other, and is interrupted at the proximal end 40 of the segments 38 and is retracted on each side of this first segment to form one of the two straight segments 38 of the stiffener 34.

The fabric of the fibres used to form the stiffener 34 is composed of an assembly of "warp" fibres that have a principal direction along the direction of the material to be produced and "weft" fibres that are perpendicular to the warp fibres.

If a curved shape stiffener 34 is made, the warp fibres and the weft fibres will no longer be perpendicular, and in this case the fabric is said to be offset. There are complex fabrication methods to avoid this offset despite the curved shape of the stiffener, which would increase the production cost of the platform 18.

Making a stiffener 34 from two straight segments can limit the offset of the fabric, consequently giving good resistance of the fabric during the manufacturing process of the platform 18, and make the manufacturing process simpler than a process for manufacturing a platform comprising a curved stiffener.

It will be understood that the invention is not limited to a platform 18 comprising a stiffener 34 formed solely in two segments 38 and that the stiffener may comprise a larger number of segments 38, this number being defined relative to the curvature of the principal wall 20 of the platform 18.

Figure 8:
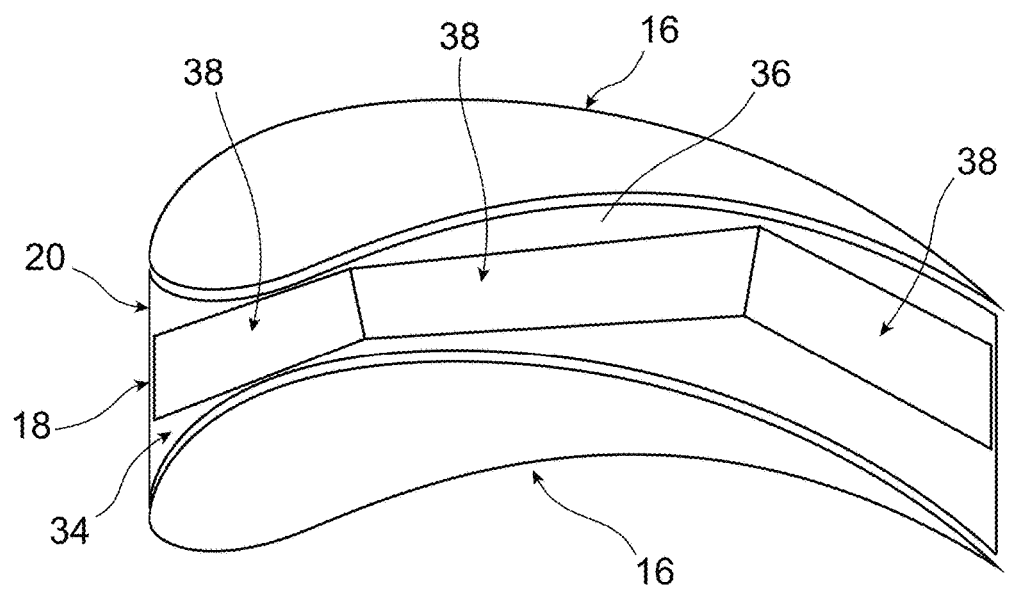
FIG. 8 is a bottom view of a platform showing the relative shape of the principal wall of the platform and blades and also showing another embodiment of a stiffener comprising three segments.

FIG. 8 represents a platform comprising a stiffener composed of three segments 38, as an example of a stiffener composed of more than two segments 38.

The width of each segment 38 is defined so that each segment 38 of the stiffener 34 is as wide as possible.

The invention claimed is:

1. Platform (18) for a fan (12) of a turbomachine (10) that will be mounted on a hub (14) of the fan (12) between two adjacent blades (16), the platform comprising
a principal wall (20) with a principal longitudinal orientation (L), that has a curved shape along a longitudinal principal direction,
a stiffener (34) that is mounted on a face (36) of the principal wall (20), the stiffener being made of a single part made of composite material, of which a section of the stiffener (34) in a plane perpendicular to the principal longitudinal direction of the principal wall, comprises a first transverse end wall (44) located on a first side, a second transverse end wall (46) located at a second end and a back wall (48) transversely connecting the two transverse end walls (44, 46),
wherein the stiffener (34) comprises at least two straight segments (38) inclined relative to each other and inclined relative to the longitudinal principal direction, and
wherein each segment comprises a first transverse end wall that extends vertically downwards, a second transverse end wall that extends vertically downwards and a bottom wall transversely connecting the lower end edges of the two transverse walls.

2. Platform (18) according to claim 1, characterised in that each segment (38) comprises a proximal end (40) that is located longitudinally close to an adjacent segment (38), and in that the proximal end (40) of each segment (38) is offset transversely relative to the proximal end (40) of an adjacent segment (38) along a transverse direction perpendicular to the longitudinal principal direction of the principal wall (20).

3. Platform (18) according to claim 2, characterised in that the proximal ends (40) of two adjacent segments (38) are longitudinally adjacent to each other.

4. Platform (18) according to claim 1, characterised in that the first transverse end wall (44) of one segment (38) and the second transverse end wall (46) of an adjacent segment (38) prolong each other.

5. Platform (18) according to claim 1, characterised in that the one end of the first transverse end wall (44) of a segment (38) that is located at the proximal end (40) of said segment (38), is offset transversely from one end of the second transverse end wall (46) of an adjacent segment (38), that is located at the proximal end (40) of said adjacent segment (38).

6. Fan (12) for a turbomachine (10) comprising a central hub (14) supporting blades (16) distributed around a principal axis of the fan (12) and platforms (18) according to claim 1, in which each platform (18) is fixed to the hub (14) and is positioned between two adjacent blades (16).

7. Fan (12) according to claim 6, characterised in that the principal wall (20) of each platform (18) comprises a first edge (24) that is in contact with an intrados wall of a first blade (16) and a second edge (26) that is in contact with an extrados wall of a second blade (16).

8. Fan (12) according to claim 6, characterised in that the minimum transverse distance between a first edge (24) and a second edge (26) is less than the width of the stiffener.

\* \* \* \* \*